US006667838B2

(12) United States Patent
Lin et al.

(10) Patent No.: US 6,667,838 B2

(45) Date of Patent: Dec. 23, 2003

(54) OPTICAL TRAPPING SKIRT FOR ADJUSTING THE DIAMETER OF A BEAM PASSING THEREOF

(75) Inventors: Yaomin Lin, Hsinchu (TW); Hau-Wei Wang, Taipei (TW); Chieh-Yi Lo, Kaohsiung (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 10/145,720

(22) Filed: May 16, 2002

(65) Prior Publication Data

US 2003/0117720 A1 Jun. 26, 2003

(30) Foreign Application Priority Data

Dec. 21, 2001 (TW) ....................................... 90131933 A

(51) Int. Cl.[7] .................................................. G02B 9/08

(52) U.S. Cl. ....................................... 359/739; 359/738

(58) Field of Search ................................ 359/738–740; 396/166, 170; 353/97; 355/34; 352/141; 348/363

(56) References Cited

U.S. PATENT DOCUMENTS 3,584,558 A * 6/1971 Easterly ...................... 396/505
5,121,251 A * 6/1992 Edwards ..................... 359/368
5,842,055 A * 11/1998 Tamura ....................... 396/72

* cited by examiner

*Primary Examiner*—Jordan M. Schwartz
(74) *Attorney, Agent, or Firm*—Birch, Stewart, Kolasch & Birch, LLP

(57) ABSTRACT

The invention provides an optical trapping skirt for adjusting the diameter of a beam passing thereof by varying the aperture. The optical trapping skirt has a body of bell shape and an iris diaphragm of bell shape, wherein the iris diaphragm of bell shape is installed inside the body so as to construct a ring like cavity. The undesired portion of the beam, which is incident on the iris diaphragm, is trapped in the ring like cavity and cannot be escaped. The aperture of the iris diaphragm is adjustable, so the diameter of the beam passing the optical trapping skirt is also controllable.

5 Claims, 3 Drawing Sheets

OPTICAL TRAPPING SKIRT FOR ADJUSTING THE DIAMETER OF A BEAM PASSING THEREOF

BACKGROUND OF THE INVENTION

1. Field of the Invention

The invention relates to an optical trapping skirt for adjusting the diameter of a beam passing thereof, and more particularly to an optical trapping skirt for eliminating the undesired light, such as reflected light and stray light.

2. Description of the Related Art

FIG. 1 schematically shows a conventional trapping skirt. As shown in FIG. 1, the conventional trapping skirt is also named Wood's horn, and has a hollow-horn structure 1 painted dark. When a beam b enters the conventional trapping skirt 1, the beam b is trapped and cannot escape. However, the size of the opening 2 of the conventional trapping skirt 1 is fixed. When the cross-sectional area of a beam is greater than the opening of the conventional trapping skirt, the conventional trapping skirt merely captures partial light. Moreover, the conventional trapping skirt cannot capture some light having special shape, such as an annular light.

FIG. 2 schematically shows a conventional diaphragm. As shown in FIG. 2, the conventional iris diaphragm 3 is a two-dimensional plane structure and has a plurality of knife-blades 4 lapping over each other. The conventional iris diaphragm 3 has a pupil 5, whose size is varied and controlled by a manual or automatic mechanism. Consequently, the desired light passes the pupil of the conventional diaphragm, and the undesired light is blocked by the knife-blades. However, when the undesired light is incident on the knife-blades, the reflected light r is generated. When the reflected light r is incident on any optical parts, it is easy to transfer the reflected light r into stray light m. The stray light m is capable of traveling through the conventional diaphragm 3, and the noise to signal ratio is increased.

SUMMARY OF THE INVENTION

To solve the above problems, it is an object of the present invention to provide an optical trapping skirt for adjusting the diameter of a beam passing thereof. The invention combines the conventional trapping skirt and the mechanism of the iris diaphragm, so as to block the undesired light entirely.

According to the object mentioned above, the optical trapping skirt for adjusting the diameter of a beam passing thereof includes a body having a first opening, a second opening larger than the first opening, and a sidewall extending from the first opening to the second opening, and an iris diaphragm of bell shape having an aperture which is smaller than the first opening. The iris diaphragm of bell shape is positioned in the sidewall and installed on the second opening, so as to construct a ring like cavity.

One feature of the invention is that when a beam having a diameter greater than the aperture enters the first opening, the undesired light is trapped in the ring like cavity by adjusting the aperture size. Furthermore, the invention can vary the diameter of the beam passing the first opening.

Another feature of the invention is that the undesired light is trapped in the ring like cavity wherefrom the undesired light cannot escape.

Another feature of the invention is that the optical trapping skirt is further has a stand. Thus, the optical trapping skirt is applied to any optical system.

The invention has an advantage of eliminating the stray light and the background light.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENTS

Figure 1:
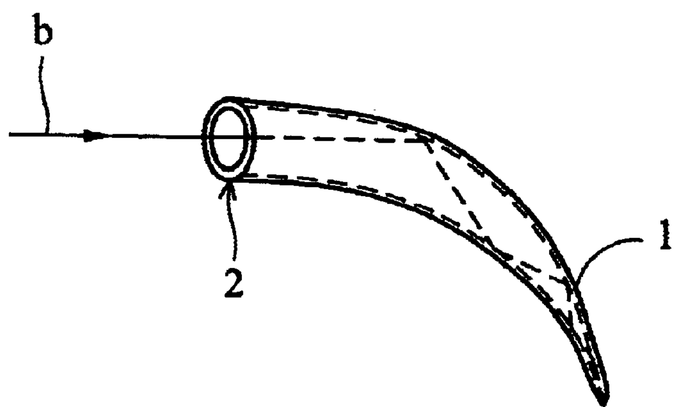
FIG. 1 schematically shows a conventional trapping skirt.
Figure 2:
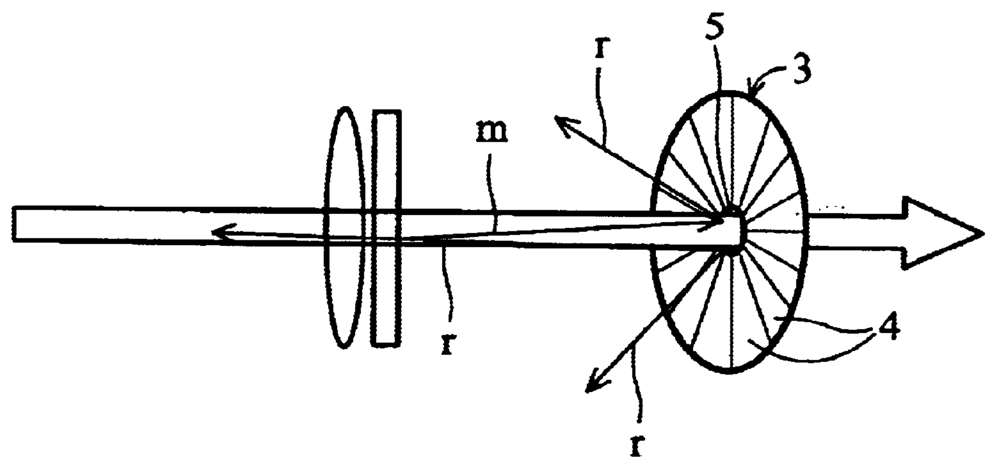
FIG. 2 schematically shows a conventional iris diaphragm.
Figure 3:
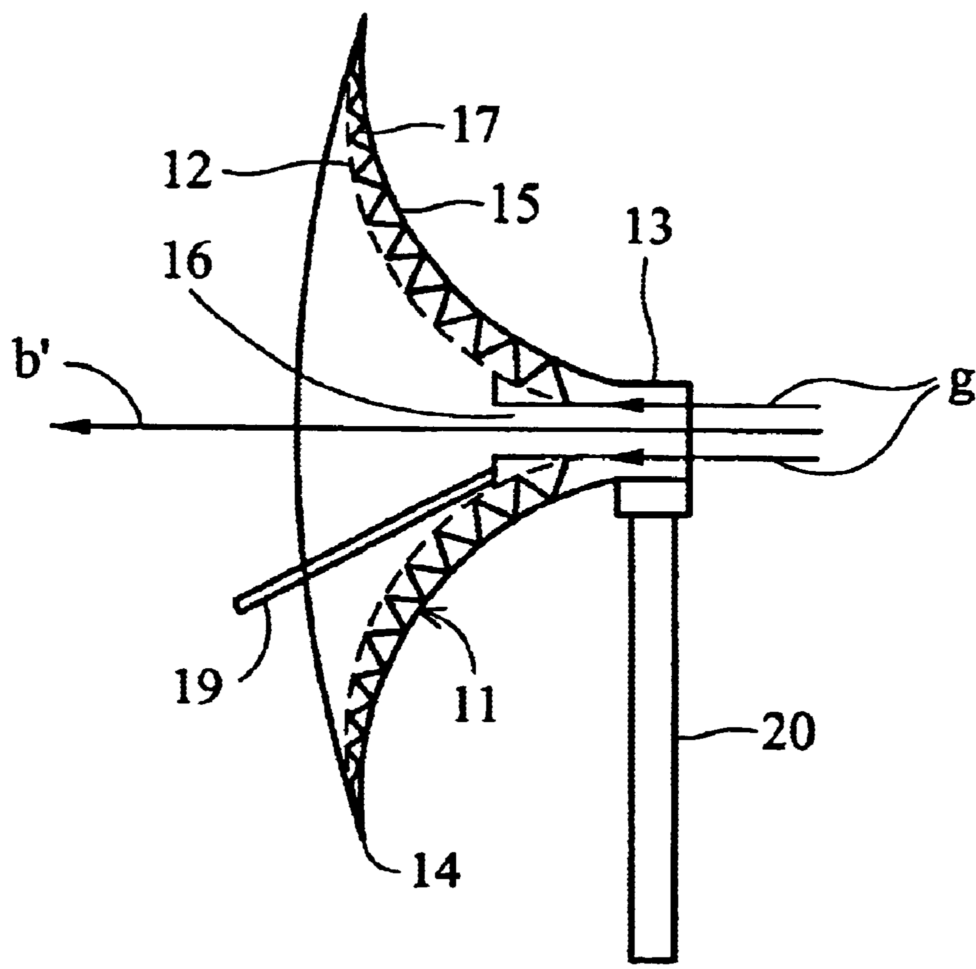
FIG. 3 is a cross-section schematically showing the optical trapping skirt according to the invention.

FIG. 3 is a cross-section schematically showing the optical trapping skirt according to the invention. As shown in FIG. 3, the optical trapping skirt 10 for adjusting the diameter of a beam passing thereof includes a body 11 of bell shape and an iris diaphragm 12 of bell shape. The body 11 of bell shape has a first opening 13, a second opening 14 and a sidewall 15, wherein the second opening 14 is larger than the first opening 13 and the sidewall 15 extends from the first opening 13 to the second opening 14. The iris diaphragm 12 of bell shape has an aperture 16, which is smaller than the first opening 13. Furthermore, the iris diaphragm 12 of bell shape is installed on the second opening 14 or the sidewall 15, which is adjacent to the second opening 14, so as to construct a ring like cavity 17.

Figure 4A:
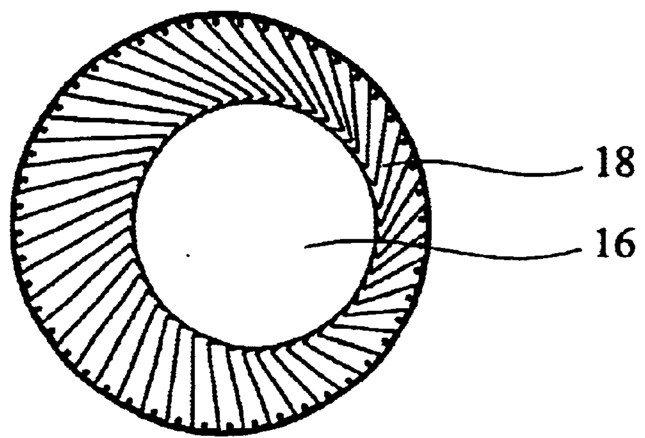
FIGS. 4A and 4B schematically illustrates that the aperture of the optical trapping skirt is varied by adjusting the iris diaphragm of bell shape.
Figure 4B:
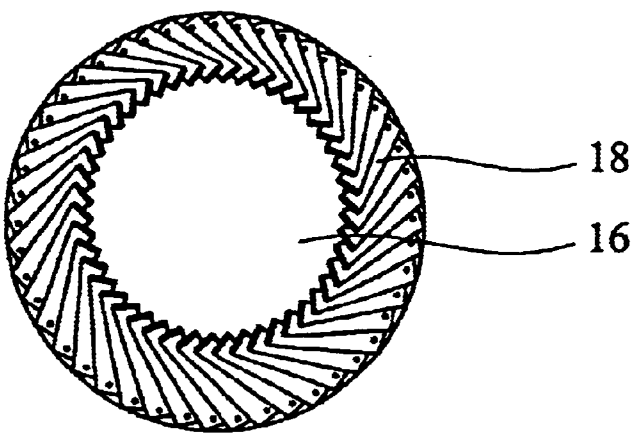

FIGS. 4A and 4B schematically illustrates that the aperture of the optical trapping skirt is varied by adjusting the iris diaphragm of bell shape. The iris diaphragm 12 of bell shape includes a plurality of knife-blades 18 lapping over each other, and an adjusting mechanism 19. The adjusting mechanism 19 adjusts the lapping area of each knife-blade 18. Consequently, the adjusting mechanism, such as an adjusting rod, adjusts the size of the aperture 16 of the iris diaphragm 12 of bell shape.

Referring to FIG. 3, when a beam, whose diameter is larger than the aperture, enters the first opening 13, the undesired light g is trapped in the ring like cavity 17 by adjusting the size of the aperture 16 by using the adjusting mechanism 19. When the undesired light g is trapped by the ring like cavity 17, it cannot escape therefrom. Thus, the optical trapping skirt capable 10 of adjusting the aperture thereof prevents generating stray light according to the invention. Moreover, the iris diaphragm 12 of bell shape regulates the diameter of the beam b passing the first opening 13.

The body of bell shape and the iris diaphragm of bell shape are painted black, so the invention further prevents the undesired light from escaping and generating stray light. The optical trapping skirt 10 of the invention further has a stand 20, and is applied to any optical system, such as a spectrometer, by using the stand 20. Thus, the optical trapping skirt 10 of the invention eliminates the stray light and any weak noise.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. An optical trapping skirt for adjusting the diameter of a beam passing thereof, comprising:

a body comprising a first opening, a second opening larger than the first opening and a sidewall extending from the first opening to the second opening; and an iris diaphragm comprising an aperture smaller than the first opening, wherein the iris diaphragm of bell shape is installed on the sidewall to construct a ring like cavity.

2. The optical trapping skirt for adjusting the diameter of a beam passing thereof as claimed in claim 1, wherein the color of the body is black.

3. The optical trapping skirt for adjusting the diameter of a beam passing thereof as claimed in claim 1, wherein the color of the iris diaphragm of bell shape is black.

4. The optical trapping skirt for adjusting the diameter of a beam passing thereof as claimed in claim 1, wherein the iris diaphragm further comprises:

a plurality of knife-blades lapping over each other; and an adjusting mechanism for changing the lapping area of each knife-blade and adjusting the size of the aperture.

5. The optical trapping skirt for adjusting the diameter of a beam passing thereof as claimed in claim 1, further comprising a stand for applying the optical trapping skirt to any optical system.

* * * * *